No. 857,461. PATENTED JUNE 18, 1907.
E. C. HORST & J. EHRHORN.
HOP PICKER.
APPLICATION FILED OCT. 17, 1906.
2 SHEETS—SHEET 2.
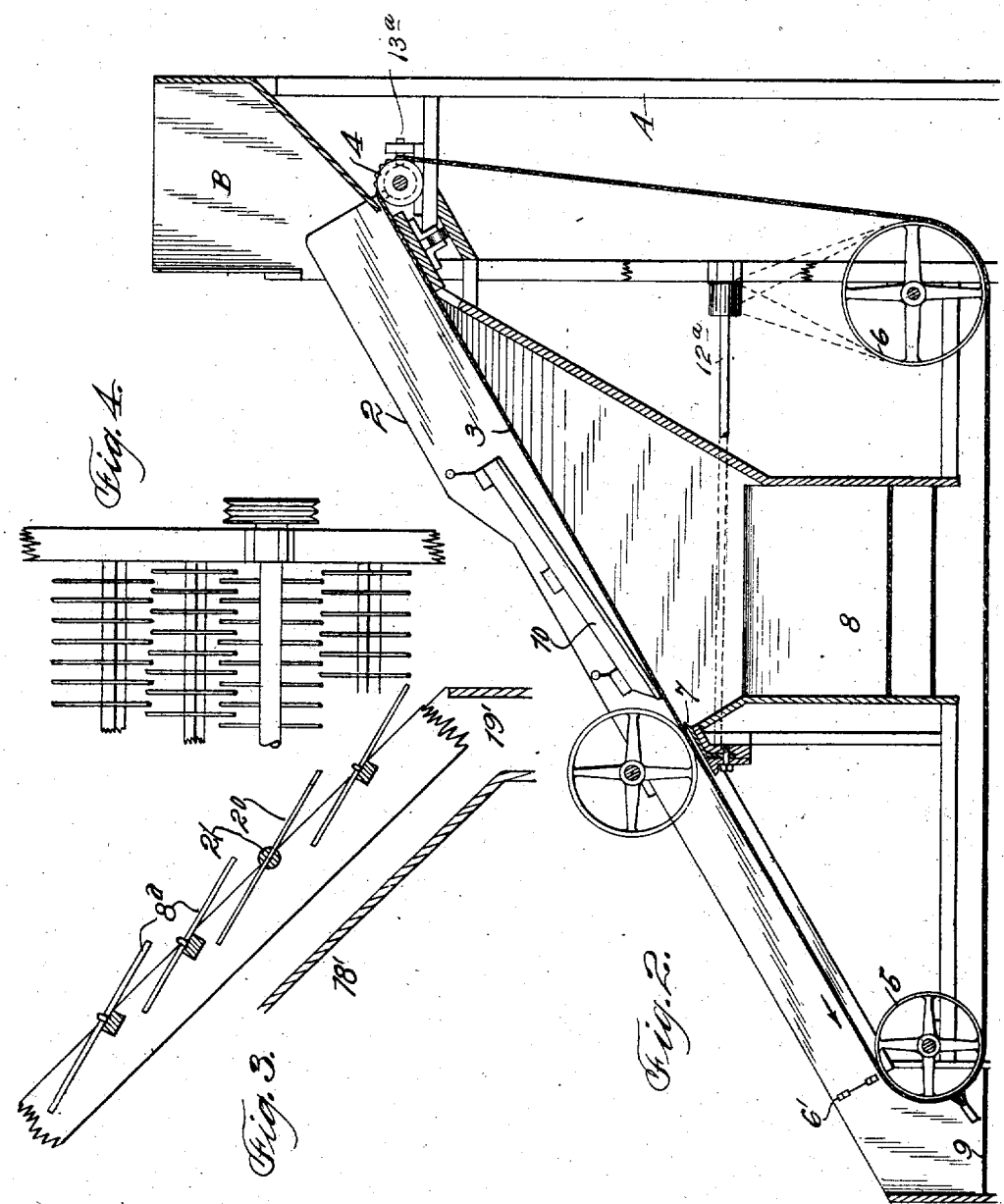
WITNESSES:
F. E. Maynard.
INVENTORS,
Emil Clemens Horst and
John Ehrhorn,
BY
Geo. H. Strong
ATTORNEY

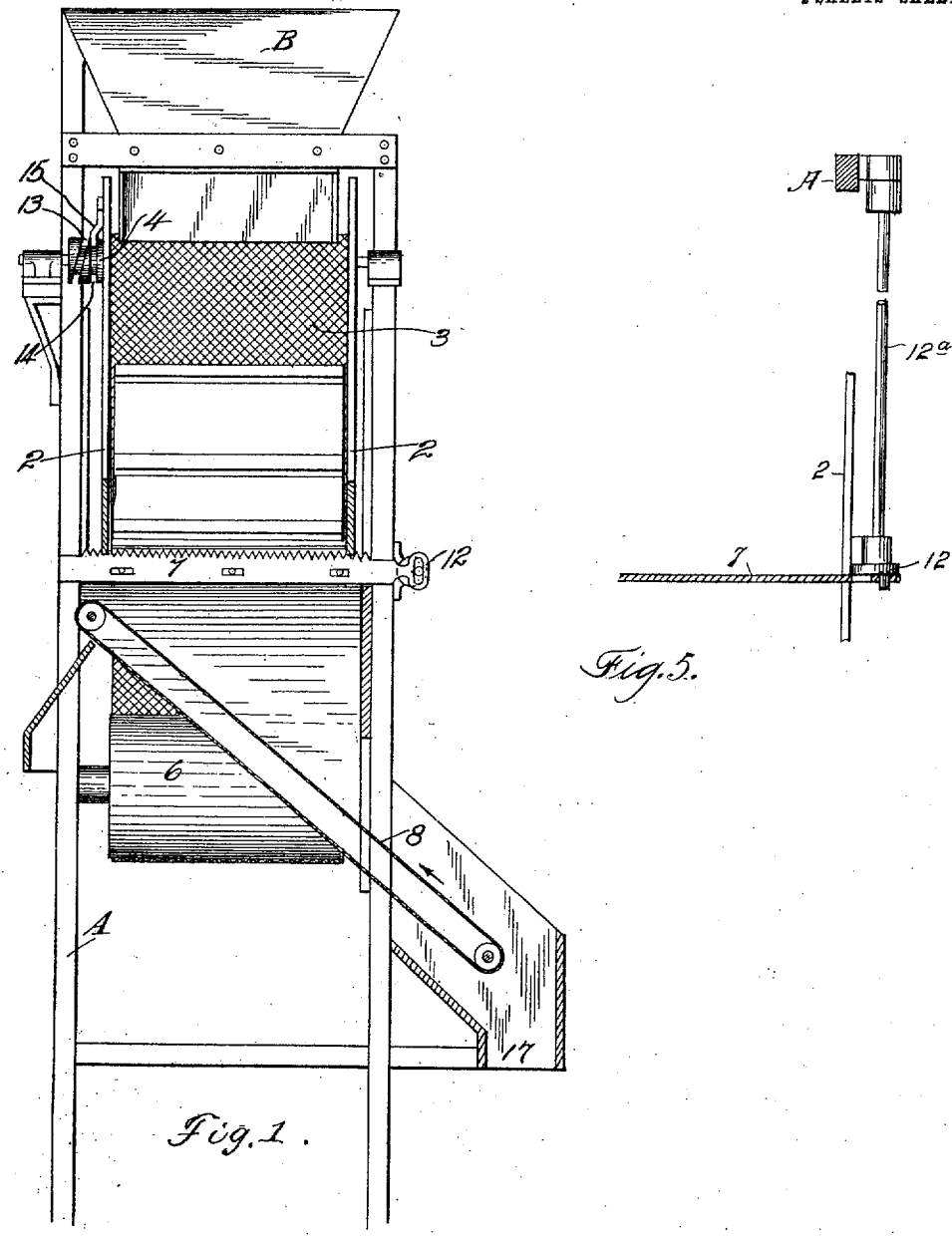

UNITED STATES PATENT OFFICE.

EMIL CLEMENS HORST, OF SAN FRANCISCO, AND JOHN EHRHORN, OF PERKINS, CALIFORNIA, ASSIGNORS TO E. CLEMENS HORST CO., OF SAN FRANCISCO, CALIFORNIA, A CORPORATION OF NEW JERSEY.

HOP-PICKER.

No. 857,461.  Specification of Letters Patent.  Patented June 18, 1907.

Application filed October 17, 1906. Serial No. 339,376.

*To all whom it may concern:*

Be it known that we, EMIL CLEMENS HORST, of the city and county of San Francisco, State of California, a citizen of the United States, and JOHN EHRHORN, of Perkins, county of Sacramento, State of California, a citizen of Germany, have invented new and useful Improvements in Hop-Pickers, of which the following is a specification.

Our invention relates to a machine by which hops may be picked or separated from the vines upon which they grow.

It consists of an endless traveling screen upon which the hop vines are thrown, and through which the hops upon their stems are caused to depend; means for severing the hops from the stems, and in details of construction which will be more fully explained by reference to the accompanying drawings, in which—

Figure 1 is an end view and partial section of my apparatus. Fig. 2 is a side elevation in section. Fig. 3 is an enlarged edge view and partial section of a modified form of leaf separating device. Fig. 4 is a partial front view and plan of the same. Fig. 5 is a detail showing a side elevation partly in section, of the means for reciprocating the knife.

A is a supporting frame of any suitable construction, and B is a hopper or receiver at the upper end.

Extending diagonally downward from this receiver are side boards 2 between which, and forming a bottom thereto, is an endless traveling screen 3 passing over a pulley 4 contiguous to the hopper B, and another pulley 5 at the lower end, and a return pulley 6 located with relation to the first named pulleys so that the screen may travel in a triangular path as shown, the upper portion forming practically the bottom between the side boards 2.

The screen may be caused to travel by any suitable connection with one of the pulley or drum shafts which may form the driving shaft.

The shaft of the drum is here indicated as carrying means by which power may be transmitted to drive the screen.

The sides 2 are here shown as hinged at 6' so that the upper ends may be moved laterally about these hinges, and the upper drum 4 over which the screen passes is movable in unison with the movement of these sides so that the screen and sides are given a shaking movement which, when vines having hops and leaves upon them are delivered upon the screen from the hopper B, will give a sufficient shaking motion to cause the hops to fall through the screen, hanging below the screen from their stems, while the vines lie on the top of the screen, and the mass is thus gradually carried downward until it arrives at reciprocating cutting knives 7 which are movable transversely to the path of travel of the screen and serve to sever the stems allowing the hops to fall upon an inclined conveyer 8 which separates the leaves and hops.

The vines are carried downward by the screen, and at the lower end are delivered upon a second carrier 9.

In order to keep the vines and hops pressed closely upon the screen 3, I have shown a superposed plate 10 converging toward the knives or cutters 7, and as the belt 3 travels, the hop vines passing between the convergent plate and the screen, will be pressed down upon the screen, thus insuring the hops falling through the meshes of the screen and depending so as to be severed by the knives.

The knives may be reciprocated in any suitable or desired manner, as by a crank disk mounted upon a driven shaft at the side of the frame and engaging with the reciprocating portion of the cutter, as shown at 12.

In order to produce the side movement of the upper end of the screen 3, and the inclosing side boards 2, the drum 4 over which the screen passes has made in it a cam groove 13, and a fixed pin entering this groove causes the drum to reciprocate endwise carrying with it the screen.

A second groove is made straight around the drum as shown at 14, and a pin 15 fixed to one of the side boards 2, engages this groove, so that when the drum is reciprocated endwise it reciprocates the upper ends of the sides 2 simultaneously; the shaking thus produced is sufficient to cause the hop berries to drop through the screen openings and depend beneath.

The hops and leaves which drop through the meshes in the screen or are severed from the vines by the knife, fall upon the endless conveyer belt 8, which is disposed at an incline of approximately 45°, and is arranged to have its upper plane travel upward. We have discovered that by using a belt inclined and traveling as stated, and running at approximately 200 feet a minute that the leaves will cling to the belt and be carried upward and discharged, while the hops or the fruit itself will roll down the belt and be collected in the bin 17, clean and free from rubbish. Of course the speed and the inclination of the belt might vary slightly according to the condition of the hops.

In Fig. 3 I have shown a modification of the means for segregating the hops and leaves which fall through the screen. In this case I employ a series of inclined pins 8ª projecting in the line of travel of the hops and leaves, and these pins are supported so as to form a general incline, so that the hops and leaves which drop upon the upper end of this device will roll and slide down over the pins which are placed so closely together that the hops will not fall through and will be delivered from the lower end of the device into the receiver 17', but the leaves may fall through between the pins and be received upon an inclined chute 18' and discharge into a second receiver 19' with which the end of the chute connects.

In order to agitate the leaves and cause them to take various positions, particularly to stand on edge so as to insure their falling between the pins 8ª, I have shown agitating arms 20 radiating from shafts as at 21, shown in Figs. 3 and 4, and these shafts are revolved by any suitable connection with other movable part of the apparatus, so that in their revolution the pins 20 will continually rise upward between the arms 8ª, and contacting with the leaves and hops will lift and loosen them up as they move down over the separating device, and while the hops cannot fall between the wires, the leaves, being compelled to take various positions, will at some point during their movement downward take an edge position which will allow them to drop through when separate from the hops.

Having thus described our invention, what we claim and desire to secure by Letters Patent is—

1. In a hop picking and separating apparatus, an inclined traveling screen and sides to which the screen forms a bottom, means for delivering hop vines upon the screen, means for agitating the screen and sides transversely to cause the hops to depend there-through, and a cutter located beneath the screen whereby the hops are separated, said cutter having its cutting edge presented opposite to the travel of the screen and against which edge the screen carries the vines, and means for reciprocating the cutter transversely of the screen.

2. In an apparatus for picking hops, an endless traveling inclined screen, means for transversely shaking the screen to cause the hops to depend there-through, a cutter by which the hops are severed from the vines upon the top of the screen, and an upwardly traveling inclined endless carrier upon which the severed leaves and hops will fall, and means for operating said carrier whereby the leaves are carried upward and discharged, and the hops move downward.

3. In an apparatus for picking and separating hops, an endless traveling inclined screen, means for delivering vines with hops thereon upon the top of the screen, side boards hinged at the lower end, and of which the screen forms a bottom, a drum over which the upper end of the screen passes having a cam groove, and a fixed pin entering said groove whereby the drum and the upper end of the screen are oscillated transversely.

4. In an apparatus for picking and separating hops, an endless traveling inclined screen, means for delivering vines and hops upon the upper end of the screen, side boards of which the screen forms a bottom, said boards being hinged at the lower end, a drum over which the upper end of the screen passes, said drum having a cam groove, a fixed pin engaging said groove whereby the drum and upper end of the screen are oscillated transversely, said drum having a circular groove formed in it, and connections between the side boards and said groove whereby the said boards are caused to oscillate in unison with the movements of the drum and screen.

5. In an apparatus for picking and separating hops from the vines, an endless traveling inclined screen having hinged side boards, means for reciprocating the upper end of the screen and the side boards in unison, a converging directing plate located above the screen, a reciprocating knife or cutter below the screen whereby the hops are separated from the vines, and independent receiver for the hops and leaves.

6. In hop picking apparatus, a movable perforated support for the hops and vines, and an inclined upwardly traveling endless conveyer arranged beneath said support to receive the hops and leaves falling through the openings in the support.

In testimony whereof we have hereunto set our hands in presence of two subscribing witnesses.

EMIL CLEMENS HORST.
JOHN EHRHORN.

Witnesses:
E. P. CHRISTIE,
ERNST LANGE.